(12) United States Patent
Jiang et al.

(10) Patent No.: US 10,102,410 B2
(45) Date of Patent: Oct. 16, 2018

(54) TERMINAL DEVICE WITH FUNCTION OF FINGERPRINT IDENTIFICATION

(71) Applicant: Xiaomi Inc., Beijing (CN)

(72) Inventors: Zhongsheng Jiang, Beijing (CN); Kun Yang, Beijing (CN); Jun Tao, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/153,129

(22) Filed: May 12, 2016

(65) Prior Publication Data

US 2017/0116451 A1 Apr. 27, 2017

(30) Foreign Application Priority Data

Oct. 22, 2015 (CN) .......................... 2015 1 0695539

(51) Int. Cl.
*G06K 9/00* (2006.01)
*G06F 3/044* (2006.01)
*B82Y 15/00* (2011.01)

(52) U.S. Cl.
CPC ........... *G06K 9/0002* (2013.01); *G06F 3/044* (2013.01); *G06K 9/001* (2013.01);
(Continued)

(58) Field of Classification Search
None
See application file for complete search history.

(56) References Cited

U.S. PATENT DOCUMENTS

2006/0001651 A1 1/2006 Weng et al.
2012/0086669 A1 4/2012 Kim et al.
(Continued)

FOREIGN PATENT DOCUMENTS

CN 102566840 A 7/2012
CN 102833423 A 12/2012
(Continued)

OTHER PUBLICATIONS

Notice of Allowance dated Sep. 11, 2017 for Korean Application No. 10-2016-7004798, 3 pages.
(Continued)

*Primary Examiner* — Delomia L Gilliard
(74) *Attorney, Agent, or Firm* — Brinks Gilson & Lione

(57) ABSTRACT

A terminal device for fingerprint identification may include a control component and a screen. The screen may include a screen cover, a display component, a fingerprint detection element, and a plurality of touch signal detection elements. The fingerprint detection element and the plurality of touch signal detection elements may be between the screen cover and a top surface of the display component; the fingerprint detection element may be in a free area among different touch signal detection elements; and the control component may be electrically connected with the fingerprint detection element and configured to acquire detection signal of the fingerprint detection element, generate fingerprint data based on the detection signal of the fingerprint detection element, compare the fingerprint data with reference fingerprint data stored in advance, and execute a preset control instruction if the fingerprint data matches the reference fingerprint data.

14 Claims, 6 Drawing Sheets

(52) U.S. Cl.
CPC .......... *G06K 9/00053* (2013.01); *B82Y 15/00* (2013.01); *Y10S 977/953* (2013.01)

(56) References Cited

U.S. PATENT DOCUMENTS

| | | | |
|---|---|---|---|
| 2012/0090757 A1* | 4/2012 | Buchan | G02B 26/0833 156/60 |
| 2012/0105081 A1 | 5/2012 | Shaikh et al. | |
| 2012/0169660 A1 | 7/2012 | Seo | |
| 2014/0047706 A1 | 2/2014 | Shaikh et al. | |
| 2015/0109214 A1 | 4/2015 | Shi et al. | |
| 2015/0123931 A1 | 5/2015 | Kitchens et al. | |
| 2015/0161430 A1 | 6/2015 | Saito | |
| 2015/0199553 A1 | 7/2015 | Kim et al. | |
| 2016/0034741 A1* | 2/2016 | Lan | G06K 9/00 382/124 |
| 2017/0032169 A1* | 2/2017 | Pi | G06K 9/00026 |

FOREIGN PATENT DOCUMENTS

| | | |
|---|---|---|
| CN | 104035620 A | 9/2014 |
| CN | 104063094 A | 9/2014 |
| CN | 104536638 A | 4/2015 |
| CN | 104699306 A | 6/2015 |
| KR | 10-2010-0099062 A | 9/2010 |
| KR | 10-2012-0124369 A | 11/2012 |
| KR | 10-2015-0065138 A | 6/2015 |
| KR | 10-2015-0087811 A | 7/2015 |
| RU | 2 498 390 C2 | 11/2013 |
| RU | 2 636 115 C2 | 11/2017 |

OTHER PUBLICATIONS

Office Action dated Nov. 14, 2017 for Japanese Application No. 2017-545999, 3 pages.
Extended European Search Report dated Mar. 2, 2017 for European Application No. 16163092.6, 8 pages.
International Search Report dated Mar. 29, 2016 for International Application No. PCT/CN2015/098846, 4 pages.
Office Action dated Jan. 20, 2017 for Korean Application No. 10-2016-7004798, 5 pages.
Office Action dated Mar. 3, 2017 for Russian Application No. 2016113285/08, 10 pages.
Office Action dated Apr. 20, 2018 for Mexican Application No. MX/a/2016/004314, 2 pages.

* cited by examiner

TERMINAL DEVICE WITH FUNCTION OF FINGERPRINT IDENTIFICATION

PRIORITY STATEMENT

This application claims priority to Chinese Patent Application 201510695539.8, filed on Oct. 22, 2015, the entire content of which is incorporated herein by reference.

TECHNICAL FIELD

The present disclosure relates to fields of computer technology, and more particularly, to terminal device with fingerprint identification function.

BACKGROUND

With development of technology on mobile terminals, mobile terminals may be more and more widely used and have become one of most important tools for daily work and life. In order to ensure a high level of security, a mobile terminal may implement a fingerprint identification function to unlock the mobile terminal and/or make a payment through the mobile terminal so as to secure user privacy.

Conventionally, a fingerprint detector may be provided in the mobile terminal to detect and/or images of fingerprints. In particular, a detection opening may be provided on a screen cover at a position corresponding to the fingerprint detector, over which a user may place his/her finger to contact a detection end of the fingerprint detector, thereby enabling the fingerprint detector to generate fingerprint image data based on detection signal. In this way, the mobile terminal may be able to perform a process of fingerprint identification.

SUMMARY

There may be provided a terminal device with fingerprint identification function. Technical solutions may be provided as follows.

According to an aspect of the present disclosure, a terminal device for fingerprint identification may include a screen. The screen may include a screen cover; a display component; a plurality of touch signal detection elements located between the screen cover and a top surface of the display component; a fingerprint detection element located in a free area among the plurality of touch signal detection elements. The terminal device may also include a control component electrically connected with the fingerprint detection element and, when activated, configured to obtain detection signal from the fingerprint detection element. When activated the control component is further configured to generate target fingerprint data based on the detection signal of the fingerprint detection element, compare the target fingerprint data with pre-stored reference fingerprint data, and execute a preset control instruction when the target fingerprint data matches the reference fingerprint data.

It may be to be understood that both the foregoing general description and the following detailed description may be exemplary and explanatory only and may be not restrictive of the present disclosure.

BRIEF DESCRIPTION OF THE DRAWINGS

The accompanying drawings, which may be incorporated in and constitute a part of this specification, illustrate embodiments consistent with the present disclosure and, together with the description, serve to explain the principles of the present disclosure.

Figure 1:
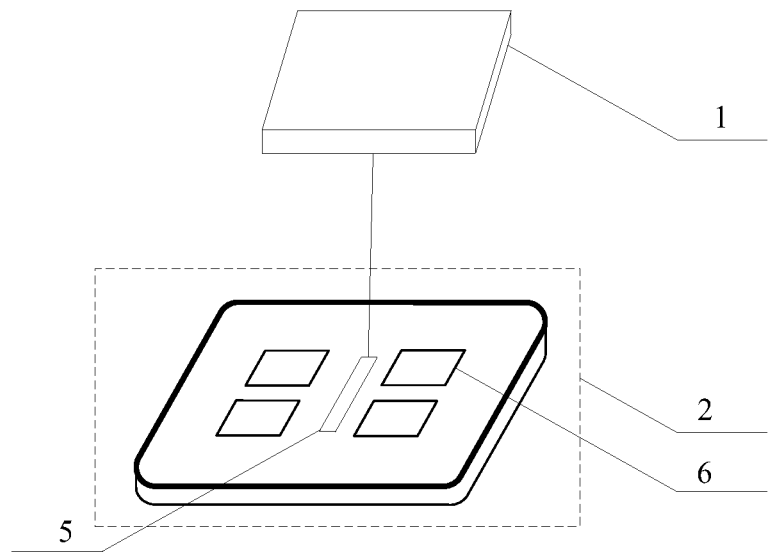
FIG. 1 is a block diagram illustrating a terminal device according to an exemplary embodiment.

Reference numbers are described as follows.
1. Control component
2. Screen
3. Screen cover
4. Display component
5. Fingerprint detection element
6. Touch signal detection element
7. Fingerprint reader
8. Processor
9. Touch controller Specific embodiments of the present disclosure are shown by the above drawings, and more detailed description will be made hereinafter. These drawings and text description are not for limiting the scope of the present disclosure concept in any way, but for illustrating the concept of the present disclosure for those skilled in the art by referring to specific embodiments.

DETAILED DESCRIPTION

Reference will now be made in detail to exemplary embodiments, examples of which may be illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they may be merely examples of apparatuses and methods consistent with aspects related to the present disclosure as recited in the appended claims.

Figure 8:
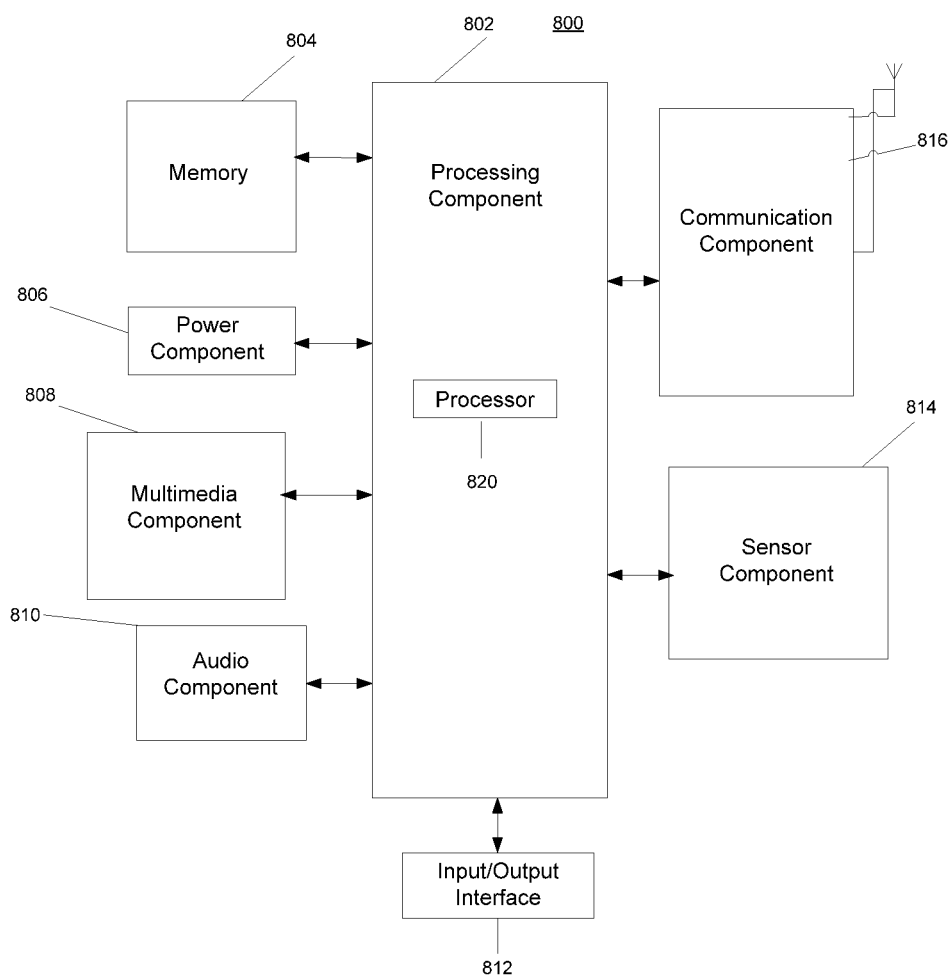
FIG. 8 is a block diagram illustrating a device suitable for fingerprint identification according to an exemplary embodiment.

FIG. 8 is a block diagram illustrating a device applicable for fingerprint identification according to an exemplary embodiment. For example, the device 800 may be a mobile phone, a computer, a digital broadcast terminal, a messaging device, a gaming console, a tablet device, a medical device, an exercise equipment, a personal digital assistant, an aircraft, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 may be configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 may include a screen providing an output interface between the device 800 and the user. In some embodiments, the screen may include a liquid crystal display (LCD) and a touch panel (TP). If the screen may include the touch panel, the screen may be implemented as a touch screen to receive input signals from the user. The touch panel may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 may include a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 may be configured to output and/or input audio signals. For example, the audio component 810 may include a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further may include a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 may include one or more sensors to support a plurality of status evaluations of the apparatus 800. For example, the sensor component 814 may include a fingerprint recognition sensor, which locates under a fingerprint recognition area on the screen of the multimedia component 808. When the mobile terminal detects a user's fingerprint, the mobile terminal may activate the fingerprint recognition sensor and display a virtual key for fingerprint recognition on the fingerprint recognition area. The virtual key may be an icon to identify the fingerprint recognition area so that the user knows where to place his/her finger on. When the user touches the virtual key, the fingerprint recognition sensor may collect the fingerprint information from the fingerprint recognition area. Further, the mobile terminal may also include a fingerprint recognition integrate circuit, which is connected to the sensor to receive signals detected thereby.

The sensor component 814 may also include one or more sensors to provide status assessments of various other aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 may be configured to facilitate communication, wired or wirelessly, between the device 800 and other devices. The device 800 may access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Figure 2:
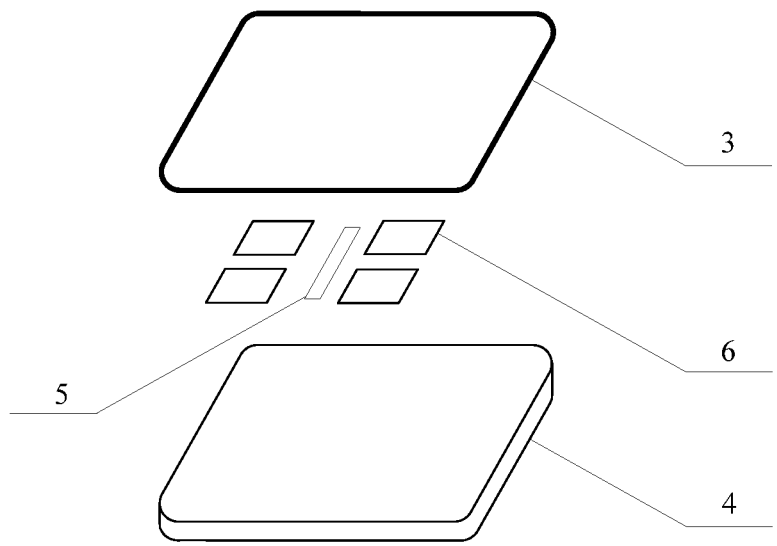
FIG. 2 is a block diagram illustrating a terminal device according to an exemplary embodiment.

FIG. 1 illustrates a terminal device with fingerprint identification function according to an exemplary embodiment of the present disclosure. The terminal device may be part of the device 800 and may include a control component 1 and a screen 2. FIG. 2 is a block diagram illustrating the screen 2 according to an exemplary embodiment. The screen 2 may include a screen cover 3, a display component 4, a fingerprint detection element 5, and a plurality of touch signal detection elements 6. The display component 4 may be configured to display images or videos; the fingerprint detection element 5 may be configured to detect fingerprint information when a fingertip touches or slides over the fingerprint detection element 5; the plurality of touch signal detection elements 6 may be configured to sense a touch of the fingertip on the screen cover 3 and then send a touch signal to the control component 1 so that the control component may activate the fingerprint detection element 5 accordingly.

In an embodiment, the fingerprint detection element 5 and the plurality of touch signal detection elements 6 may be provided between the screen cover 3 and a top surface of the display component 4; the fingerprint detection element 5 may be provided in a free area among different touch signal detection elements 6; the control component 1 may be electrically connected with the fingerprint detection element 5 and configured to acquire, receive, and/or obtain detection signal of the fingerprint detection element 5, generate fingerprint data based on the detection signal of the fingerprint detection element 5, compare the fingerprint data with reference fingerprint data stored in advance, and execute a preset control instruction if the fingerprint data matches the reference fingerprint data.

According to the embodiment of the present disclosure, the terminal device may include the control component and the screen, and the screen may include the screen cover, the display component, the fingerprint detection element and the plurality of touch signal detection elements. In the embodiment, the fingerprint detection element and the plurality of touch signal detection elements may be provided between the screen cover and the top surface of the display component; the fingerprint detection element may be provided in the free area among different touch signal detection elements; the control component may be electrically connected with the fingerprint detection element and configured to acquire detection signal of the fingerprint detection element, generate fingerprint data based on the detection signal of the fingerprint detection element, compare the fingerprint data with the reference fingerprint data stored in advance, and execute the preset control instruction if the fingerprint data matches the reference fingerprint data. Thus, the terminal device may be able to perform the fingerprint identification based on the detection signal from the fingerprint detection element sandwiched between the screen cover and the top surface of the display component without necessity of detection opening provided on the screen cover, such that strength of the screen cover may be improved.

According to an exemplary embodiment, a terminal device with fingerprint identification function may include a control component 1 and a screen 2. The screen 2 may include a screen cover 3, a display component 4, a fingerprint detection element 5 and a plurality of touch signal detection elements 6. In the embodiment, the fingerprint detection element 5 and the plurality of touch signal detection elements 6 may be provided between the screen cover 3 and a top surface of the display component 4; the fingerprint detection element 5 may be provided in a free area among different touch signal detection elements 6; the control component 1 may be electrically connected with the fingerprint detection element 5 and configured to acquire detection signal of the fingerprint detection element 5, generate fingerprint data based on the detection signal of the fingerprint detection element 5, compare the fingerprint data with reference fingerprint data stored in advance, and execute a preset control instruction if the fingerprint data matches the reference fingerprint data.

In an exemplary embodiment, a terminal device may include the control component 1 and the screen 2. The screen 2 may include the screen cover 3, the display component 4, the fingerprint detection element 5 and the plurality of touch signal detection elements 6. The fingerprint detection element 5 and the touch signal detection element(s) 6 may be made of any one or more materials selected from a group including nano silver, carbon nano tube, and graphene, or may include copper wire. Those materials may be formed into metallic nano wire to be provided between the screen cover 3 and the top surface of the display component 4. For example, the fingerprint detection element 5 and the touch signal detection element(s) 6 may be provided directly on the top surface of the display component 4. The touch signal detection element(s) 6 may be arranged in a certain manner, while the fingerprint detection element 5 may be provided in the free area among different touch signal detection element(s) 6. With such design, the screen cover 3 may be formed into a flat structure without any opening, thereby improving strength of the screen cover 3 and thus prevent the screen cover 3 from being broken in case of dropping off the terminal device.

The control component 1 may be a specially designed hardware module that is provided inside the terminal device (i.e., beneath the screen 2) and electrically connected with the fingerprint detection element 5, so as to acquire, receive, and/or obtain the detection signal from the fingerprint detection element 5 and generate the fingerprint data based on the detection signal from the fingerprint detection element 5. Furthermore, the control component 1 may include a signal filter, an amplifier circuit, an AD (Analog Digital) sample module and the like, so as to perform filtering and amplification of the detection signal from the fingerprint detection element 5. The reference fingerprint data may be stored in the control component 1 in advance and may be obtained by determining an average value of a user's fingerprint data through multiple detections.

To obtain the pre-stored reference fingerprint data, the terminal device may provide on its screen an interface with an option to set a reference fingerprint. When the user selects this option, the terminal device may receive a fingerprint setting instruction. Consequently, the control component 1 may be activated. When the user places his/her finger on the fingerprint detection element 5 (or slide his/her finger through the fingerprint detection element 5), the fingerprint detection element may acquire, receive, and/or obtain an image of the fingerprint, generate the fingerprint data and store the data in a non-transitory storage medium of the terminal device. Multiple detections may be performed for the user's fingerprint by the terminal device, such that the control component 1 may determine the average value of the fingerprint data, obtained through multiple detections, as the reference fingerprint data.

The fingerprint image may be an visual image if the fingerprint detection element 5 is an image sensor. If the fingerprint detection element 5 is a capacitance sensor, the fingerprint image may also be a document corresponding to capacitance. For example, if bulge portions on a surface of a fingertip is referred to as ridges, and recess portions thereon is referred to as valleys, thus when a user touches the screen 2 with his/her fingertip, a distance (a first distance) between a ridge and the fingerprint detection element 5 may be different from a distance (a second distance) between a valley and the fingerprint detection element 5. Accordingly, the fingerprint detection element 5 may be able to read a capacitance (a first capacitance) between the ridge and the fingerprint detection element 5 and the a capacitance (a second capacitance) between the valley and the fingerprint detection element 5. The first capacitance may correspond to the first distance, and the second capacitance may correspond to the second distance. As the user slides his/her fingertip on the fingerprint detection element 5, the fingerprint detection element 5 may read and/or obtain capacitance values corresponding to each ridge and valley through continuous detection. Further, since the capacitance values depend on values of the first and second distances, the fingerprint detection element 5 may distinguish the ridge and the valley based on the first and second capacitance values. In this way, the control component 1 may receive all of capacitance values detected by the fingerprint detection element 5, and generate the fingerprint data based on the detected capacitance values.

After obtaining the fingerprint data, the control component 1 may compare the fingerprint data generated (i.e., target fingerprint data) with the reference fingerprint data stored in advance, so as to determine similarity between the target fingerprint data and the reference fingerprint data. A preset instruction may be executed by the control component 1, if the similarity between the target fingerprint data and the reference fingerprint data falls within a preset similarity range (e.g., the similarity is greater than a predetermined value). After determining that the similarity between the target fingerprint data and the reference fingerprint data falls within the preset similarity range, the control component 1 may detect a currently displayed interface of the terminal device and execute various control instructions based on the currently displayed interface. For example, after determining that the similarity between the target fingerprint data and the reference fingerprint data falls within the preset similarity range, the control component 1 may detect and/or determine that the currently displayed interface is an unlocking interface, i.e., an interface waiting for an operation to unlock the terminal device. Since the control component 1 has determined that the similarity of the target fingerprint data and the reference fingerprint data falls within the present range, the terminal device may perform an unlock process. Similarly, if the control component 1 detects and/or determines that the currently displayed interface is payment interface, i.e., an interface waiting for an operation to conduct an online payment through the interface, the terminal device may perform a payment process.

Figure 3:
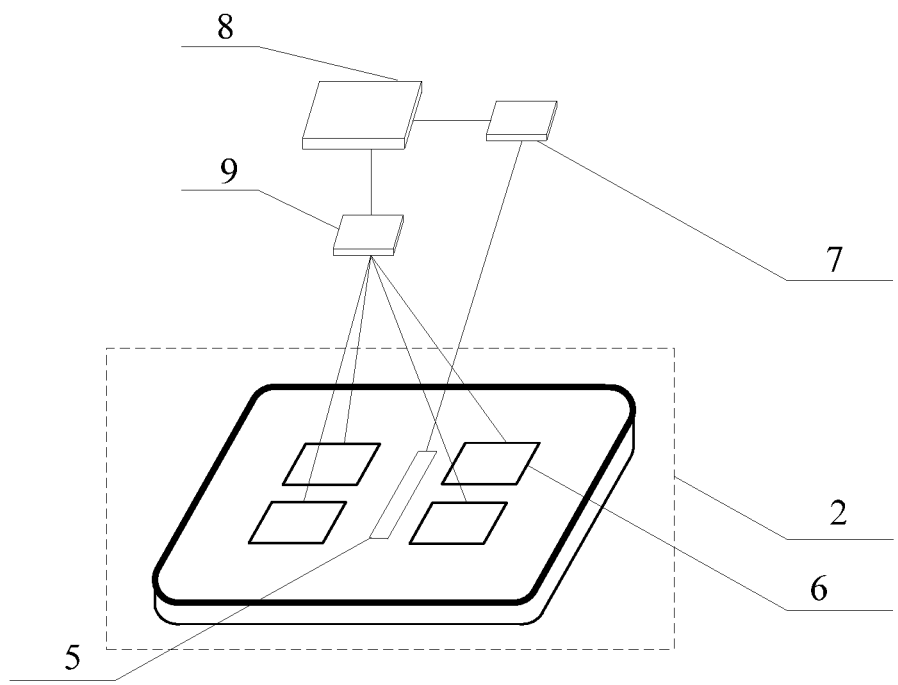
FIG. 3 is a block diagram illustrating a terminal device according to an exemplary embodiment.

Alternatively, the control component 1 may include a fingerprint reader 7 and a processor 8 as shown in FIG. 3. The fingerprint reader 7 may be electrically connected with the fingerprint detection element 5 and electrically connected with the processor 8. In an embodiment, the fingerprint reader 7 may be configured to acquire and/or receive the detection signal of the fingerprint detection element 5 and generate the fingerprint data based on the detection signal of the fingerprint detection element 5. In an embodiment, the processor 8 may be configured to compare the fingerprint data with the reference fingerprint data stored in advance, and execute the preset control instruction if the fingerprint data matches the reference fingerprint data.

In an embodiment, as shown in FIG. 3, the control component 1 may include the fingerprint reader 7 and the processor 8. The fingerprint reader 7 and the processor 8 may locate inside the terminal device. The fingerprint reader 7 may be electrically connected with the fingerprint detection element 5 and electrically connected with the processor 8. Moreover, the fingerprint reader 7 may acquire, obtain, and/or receive the detection signal from the fingerprint detection element 5, process and convert the detection signal into data identifiable and processible by the processor 8, that is, generates the fingerprint data, and transmits the target fingerprint data to the processor 8.

The reference fingerprint data may be stored in the processor 8 in advance and may be obtained by determining an average value of a user's fingerprint data through multiple detections. To obtain the pre-stored reference fingerprint data, the terminal device may provide on its screen an interface with an option to set a reference fingerprint. When the user selects this option, the terminal device may receive a fingerprint setting instruction. Consequently, the fingerprint reader 7 may be activated. When the user places his/her finger on the fingerprint detection element 5 (or slide his/her finger through the fingerprint detection element 5), the fingerprint detection element 5 may acquire, receive, and/or obtain an image of the fingerprint. The fingerprint reader 7 may receive the image from the fingerprint detection element 5, generate the fingerprint data and transmit the fingerprint data to the processor 8. The processor 8 may store the fingerprint data in a non-transitory storage medium of the terminal device. The terminal device may require the user to scan and/or slid his/her finger multiple times to obtain multiple images of the fingerprint. The corresponding fingerprint data of the multiple images may then be transmitted to the processor 8 to determine, after receiving the fingerprint data, the average value thereof as the reference fingerprint data.

After receiving the fingerprint data (i.e., the target fingerprint data), the processor 8 may compare the target fingerprint data with the reference fingerprint data stored in advance, so as to determine similarity between the target fingerprint data and the reference fingerprint data. A preset instruction may be executed by the processor 8, if the similarity between the target fingerprint data and the reference fingerprint data falls within a preset similarity range. After determining that the similarity between the target fingerprint data and the reference fingerprint data falls within the preset similarity range, the processor 8 may detect and/or determine a currently displayed interface of the terminal device and execute various control instructions based on the currently displayed interface. Alternatively, the processor 8 may determine a waiting operation and execute the operation based on the result of similarity comparison. For example, after determining that the similarity between the target fingerprint data and the reference fingerprint data falls within the preset similarity range, the processor 8 may detect and/or determine that the currently displayed interface (or the waiting operation) is an unlocking interface, i.e., an interface waiting for an operation to unlock the terminal device. Since the processor has determined that the similarity of the target fingerprint data and the reference fingerprint data falls within the present range, the terminal device may perform an unlock process. But if the processor 8 determines that the similarity of the target fingerprint does not fall into the preset similarity range (e.g., the similarity is less or equal to the predetermined value), the processor 8 may refuse to perform the unlock process. Similarly, if the processor 8 detects and/or determines that the currently displayed interface is a payment interface, i.e., an interface waiting for an operation to conduct an online payment through the interface, or the waiting operation is an online payment operation, the terminal device may perform a payment process. However, if the processor 8 determines that the similarity of the target fingerprint does not fall into the preset similarity range (e.g., the similarity is less or equal to the predetermined value), the processor 8 may refuse to perform the online payment.

In an embodiment, the control component 1 may further include a touch controller 9, and the touch controller 9 may be electrically connected with respective one of the plurality of touch signal detection elements 6 and electrically connected with the processor 8.

In an embodiment, the control component 1 further may include the touch controller 9, and the touch controller 9 may be electrically connected with one or more of the plurality of touch signal detection elements 6 and electrically connected with the processor 8. The touch controller 9 may respectively acquire the detection signal from the one or more of the touch signal detection elements 6, convert the acquired detection signal into touch data identifiable and processible by the processor 8, and transmit the touch data to the processor 8. The processor 8 may receive the touch data transmitted from the touch controller 9 and execute a corresponding control instruction according to the received touch data. For example, the terminal device may have an application program installed in its non-transitory storage medium and may conduct certain performance to the application if a user touch an icon of the application in a predetermined way. For example, the predetermined way may be either a short touch or a long touch. The short touch may activate the application, whereas the long touch may correspond to an application deletion operation.

Figure 4:
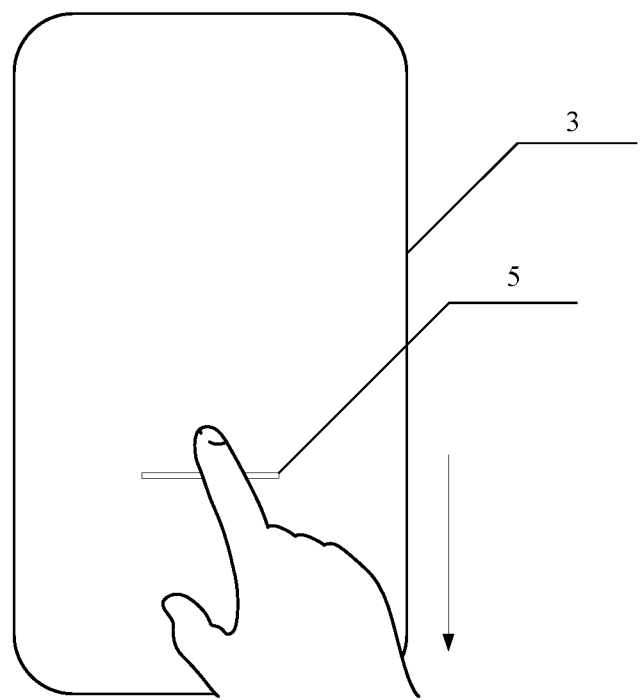
FIG. 4 is a block diagram illustrating a terminal device according to an exemplary embodiment.

In an embodiment, the fingerprint detection element 5 may be a strip fingerprint detection element 5. When a user conducts fingerprint identification, he/she may slide a finger within a region corresponding to the fingerprint detection element 5. An angle between sliding direction of the finger and the strip fingerprint detection element 5 should meet a preset condition. For example, the sliding direction may be required to be perpendicular or substantially perpendicular to the strip fingerprint detection element 5, or the angle between the sliding direction and the strip fingerprint detection element 5 may be required to be greater than a preset threshold (e.g., 87°), as shown in FIG. 4.

In an embodiment, there may be a plurality of fingerprint detection elements 5 which may be arranged in parallel with each other.

Figure 5:
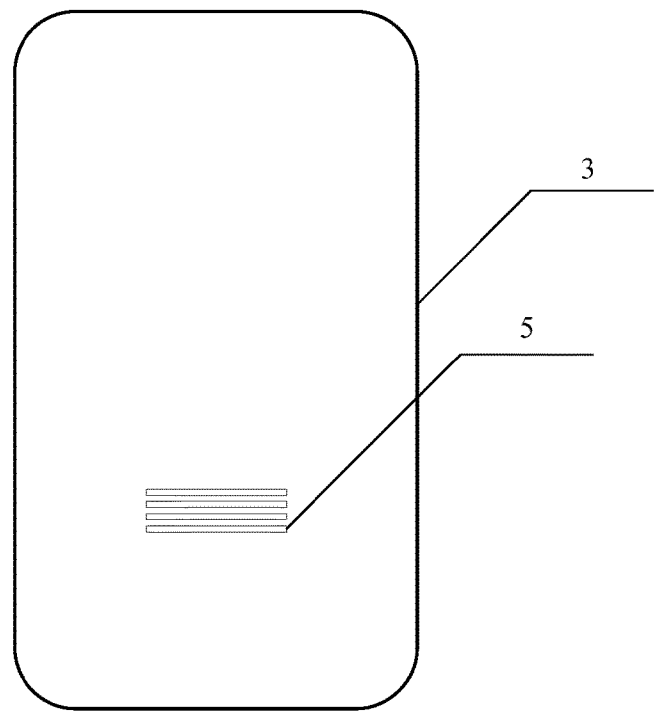
FIG. 5 is a block diagram illustrating a terminal device according to an exemplary embodiment.

In an embodiment, there may be one or more fingerprint detection elements 5. In case of a plurality of fingerprint detection elements 5, they may be arranged in parallel, as shown in FIG. 5. In this way, a relatively large finger area may be detectable, thereby improving efficiency of detection.

In an embodiment, a transparent film may be provided between the screen cover 3 and the display component 4 of the screen 2, and the touch signal detection elements 6 and the fingerprint detection element 5 may be provided on the transparent film.

In an embodiment, the transparent film may be provided between the screen cover 3 and the display component 4 of the screen 2, and the touch signal detection elements 6 and the fingerprint detection element 5 may be provided on the transparent film. Thus if there is any error in assembling the touch signal detection elements 6 and the fingerprint detection element 5, it will be the transparent film, which is a low cost material, that is wasted rather than the screen cover which is a more expensive material. Therefore, placing the touch signal detection elements 6 and the fingerprint detection element 5 on the transparent film may efficiently avoid wasting of the screen cover due to assembly error of the touch signal detection element 6 and the fingerprint detection element 5. Resource utilization may therefore be improved.

In an embodiment, the fingerprint detection element 5 may be provided widthwise in a free area among the plurality of the touch signal detection elements 6; or, the fingerprint detection element 5 may be also provided lengthwise in the free area among the plurality of the touch signal detection elements 6 (i.e., the fingerprint detection element 5 is arranged in a direction perpendicular to the widthwise direction).

In an embodiment, the fingerprint detection element 5 may be arranged along different directions in the free area among the plurality of the touch signal detection elements 6 along different direction. In case that the fingerprint detection element 5 is of a strip shape, it may be arranged in any suitable way within a free area among the plurality of the touch signal detection elements 6. For convenience of a user's sliding operation for fingerprint identification, the fingerprint detection element 5 may be provided widthwise in a free area among the plurality of the touch signal detection elements 6; or the fingerprint detection element 5 may also be provided lengthwise in the free area among the plurality of the touch signal detection elements 6; or, the fingerprint detection element 5 may also be provided diagonally in the free area among the plurality of the touch signal detection elements 6. There may be variety of arrangement manners for the touch signal detection elements 6, in which two typical ones will be described as follows.

In a first manner, the touch signal detection elements 6 may be arranged in dot matrix between the screen cover 3 and the top surface of the display component 4.

Figure 6A:
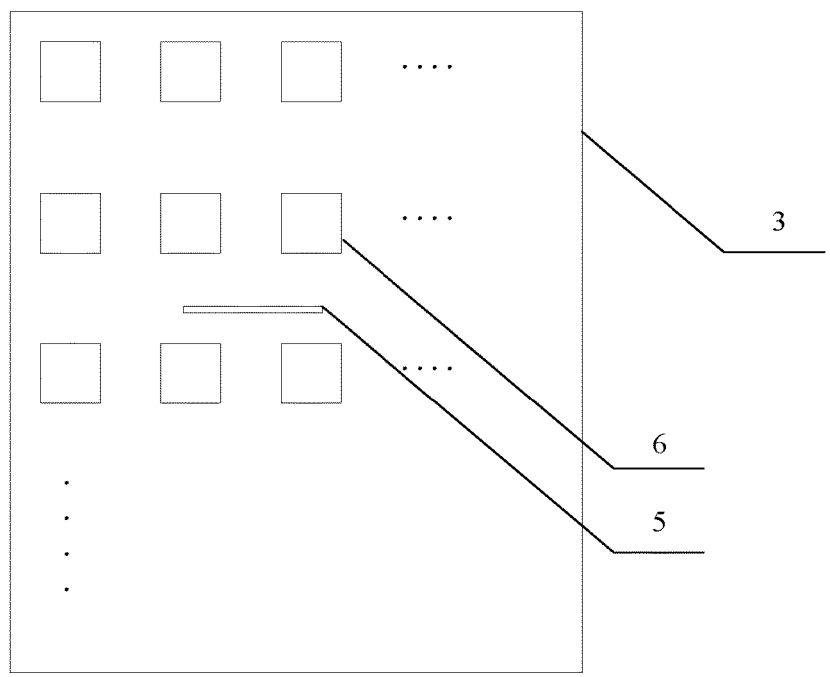
FIGS. 6a and 6b are block diagrams illustrating a terminal device according to an exemplary embodiment.
Figure 6B:
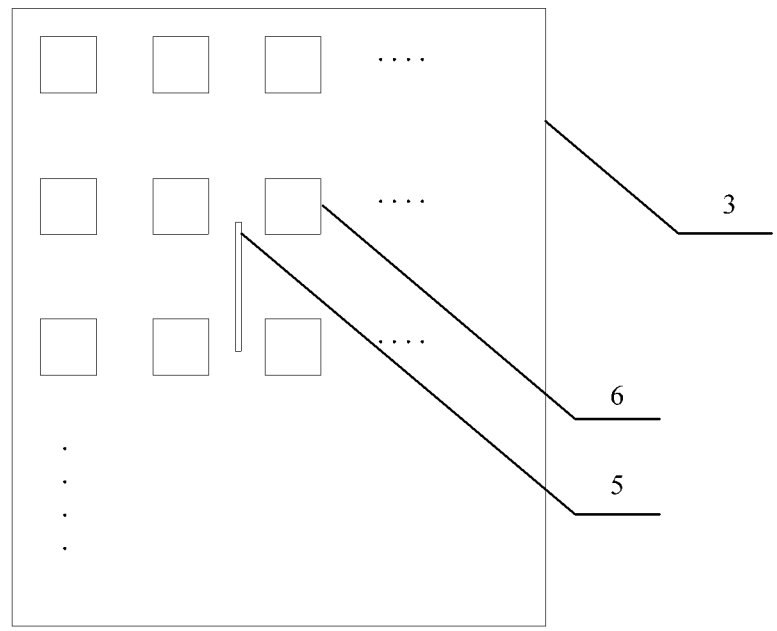

In an embodiment, the touch signal detection element 6 may be a dot-shaped touch signal detection element 6. For example, the touch signal detection element 6 may be of a round dot or a square block and distributed uniformly as a matrix between the screen cover 3 and the top surface of the display component 4, that is, distributed with fixed row spacing and fixed column spacing. The fingerprint detection element 5 may be provided widthwise in a free area among the touch signal detection elements 6 arranged in dot matrix (i.e., the fingerprint detection element 5 is provided along a width direction of the dot matrix), or may be also provided lengthwise in the free area among the touch signal detection elements 6 arranged in dot matrix (i.e., the fingerprint detection element 5 is provided along a length direction of the dot matrix), as shown in FIGS. 6a and 6b.

In a second manner, the touch signal detection elements 6 may be of a shape of a strip, and the strip touch signal detection elements 6 may be arranged in a mixture of the widthwise and lengthwise directions between the screen cover 3 and the top surface of the display component 4. i.e., some touch signal detection elements are arranged along a widthwise direction and a remainder of the touch signal detection elements are arranged along a lengthwise direction.

Figure 7A:
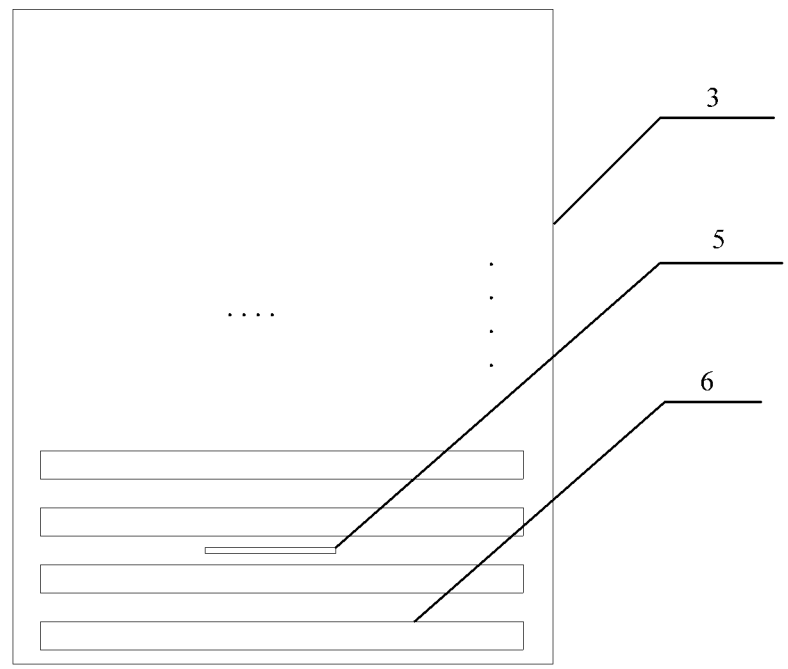
FIGS. 7a and 7b are block diagrams illustrating a terminal device according to an exemplary embodiment.
Figure 7B:
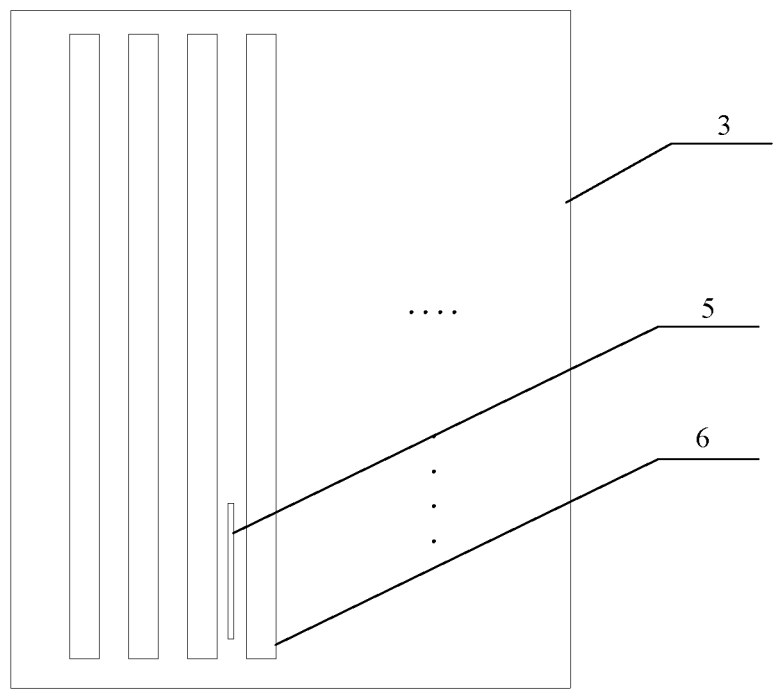

In an embodiment, the touch signal detection elements 6 may be of a shape of a strip, and the strip touch signal detection elements 6 may be arranged in a mixture and/or combination of the widthwise and lengthwise directions between the screen cover 3 and the top surface of the display component 4. There may be transparent films provided between the screen cover 3 and the display component 4 of the screen 2, where the touch signal detection elements 6 arranged widthwise may be provided on a first transparent film while those ones arranged lengthwise may be provided on a second transparent film. Both the first and second transparent films may be provided between the screen cover and the top surface of the display component 4. The fingerprint detection element 5 may be provided widthwise in a free area among the touch signal detection elements 6 arranged widthwise, or may be also provided lengthwise in the free area among the touch signal detection elements 6 arranged lengthwise, as shown in FIGS. 7a and 7b.

In an embodiment, the fingerprint detection element 5 may be provided in a lower half area between the screen cover 3 and the top surface of the display component 4.

In an embodiment, the fingerprint detection element 5 may be provided in any area between the screen cover 3 and the top surface of the display component 4. For convenience of a user's sliding operation for fingerprint identification, the fingerprint detection element 5 may be provided in the lower half area between the screen cover 3 and the top surface of the display component 4. For example, the fingerprint detection element may be provided in the middle of the lower half area, or may be provided at the right side of the lower half area.

In an embodiment, the control component 1 may be configured to acquire a capacitance value detected by the fingerprint detection element 5 and generate the fingerprint data based on the capacitance value detected by the fingerprint detection element 5.

In an embodiment, bulge portions on a surface of the fingerprint may be referred to as ridges, while recess portions thereon may be referred to as valleys. When a user touches the screen 2 with a finger, a distance (a first distance) between a ridge and the fingerprint detection element 5 may be different from a distance (a second distance) between a valley and the fingerprint detection element 5. Since capacitance values detected by the fingerprint detection element 5 depend on a distance between a detected object and the fingerprint detection element 5, different capacitance values will be derived at the ridge and the valley by the fingerprint detection element 5 covered by the finger. As the user's finger slides on the fingerprint detection element 5, the fingerprint detection element 5 may read and/or obtain capacitance values through continuous detection. In this way, the control component 1 may receive all of capacitance values detected by the fingerprint detection element 5, and generate the fingerprint data based on the detected capacitance values. Then, the control component 1 may compare the generated fingerprint data (i.e., the target fingerprint data) with the reference fingerprint data stored in advance, so as to determine similarity between the target fingerprint data and the reference fingerprint data. A preset instruction will be executed by the control component 1, if the similarity between the target fingerprint data and the reference fingerprint data falls within a preset similarity range. After determining that the similarity between the target fingerprint data and the reference fingerprint data falls within the preset similarity range, the control component 1 may detect a currently displayed interface of the terminal device and execute various control instructions based on the currently displayed interface.

According to the embodiment of the present disclosure, the terminal device, such as the device 800, may include the control component and the screen, and the screen may include the screen cover, the display component, the fingerprint detection element and the touch signal detection elements. In the embodiment, the fingerprint detection element and the touch signal detection elements may be provided between the screen cover and the top surface of the display component; the fingerprint detection element may be provided in the free area among different touch signal detection elements; the control component may be electrically connected with the fingerprint detection element and configured to acquire detection signal from the fingerprint detection element, generate fingerprint data based on the detection signal from the fingerprint detection element, compare the fingerprint data with prestored reference fingerprint data, and execute a preset control instruction if the fingerprint data matches the reference fingerprint data. Thus, the terminal device may be able to perform the fingerprint identification based on the detection signal from the fingerprint detection element sandwiched between the screen cover and the top surface of the display component without necessity of detection opening provided on the screen cover, such that strength of the screen cover may be improved.

Other embodiments of the present disclosure will be apparent to those skilled in the art from consideration of the specification and practice of the present disclosure disclosed here. This application may be intended to cover any variations, uses, or adaptations of the present disclosure following the general principles thereof and including such departures from the present disclosure as come within known or customary practice in the art. It may be intended that the specification and examples be considered as exemplary only, with a true scope and spirit of the present disclosure being indicated by the following claims.

It will be appreciated that the present disclosure may be not limited to the exact construction that has been described above and illustrated in the accompanying drawings, and that various modifications and changes may be made without departing from the scope thereof. It may be intended that the scope of the present disclosure only be limited by the appended claims.

The invention claimed is:

1. A terminal device having a fingerprint identification function, comprising:
    a screen, comprising:
        a screen cover;
        a display component;
        a plurality of touch signal detection elements positioned between the screen cover and a top surface of the display component;
        a fingerprint detection element located in a spacer area between at least two touch signal detection elements from the plurality of touch signal detection elements, wherein the fingerprint detection element comprises a rectangular strip shape, wherein the fingerprint detection element is configured to:
            detect a fingerprint input received over a length of the fingerprint detection element comprised in the rectangular strip shape; and
            generate a detection signal corresponding to the detected fingerprint input; and
    a control component electrically connected with the fingerprint detection element and, when activated, configured to obtain the detection signal from the fingerprint detection element.

2. The terminal device of claim 1, wherein the plurality of touch signal detection elements are deposed on a transparent thin film.

3. The terminal device of claim 1, wherein when activated the control component is further configured to:
    generate target fingerprint data based on the detection signal of the fingerprint detection element, compare the target fingerprint data with pre-stored reference fingerprint data, and execute a preset control instruction when the target fingerprint data matches the reference fingerprint data.

4. The terminal device of claim 1, wherein when activated, the plurality of touch signal detection elements is configured to detect a touch to the screen cover by a fingertip of a user and send a corresponding touch signal to the control component; and the control component is configured to receive the touch signal and activate the fingerprint detection element.

5. The terminal device of claim 3, wherein the control component comprises:

a fingerprint reader electrically connected with the fingerprint detection element and configured to acquire the detection signal of the fingerprint detection element, and generate the target fingerprint data based on the detection signal of the fingerprint detection element; and a processor electrically connected with the fingerprint reader and configured to compare the target fingerprint data with the reference fingerprint data, and execute the preset control instruction when the target fingerprint data matches the reference fingerprint data.

6. The terminal device of claim 5, wherein the control component further comprises a touch controller electrically connected with at least one of the plurality of touch signal detection elements and electrically connected with the processor.

7. The terminal device of claim 1, wherein the fingerprint detection element comprises a plurality of elements arranged parallel with each other.

8. The terminal device of claim 1, wherein the fingerprint detection element is arranged widthwise in the spacer area among the plurality of the touch signal detection elements.

9. The terminal device of claim 1, wherein the fingerprint detection element is arranged lengthwise in the spacer area among the plurality of the touch signal detection elements.

10. The terminal device of claim 1, wherein the fingerprint detection element is located in a lower half area between the screen cover and the top surface of the display component.

11. The terminal device of claim 1, wherein the fingerprint detection element is made from at least one of nano silver, carbon nano tube, or graphene.

12. The terminal device of claim 1, wherein when activated, the fingerprint detection element is configured to detect capacitance values between the fingerprint detection element and ridges and valleys of a fingertip touching the screen cover; and the control component is configured to obtain the capacitance values and generate the target fingerprint data based on the capacitance values.

13. The terminal device of claim 1, wherein the fingerprint detection element and the plurality of touch signal detection elements are disposed on a same layer between the screen cover and the display component.

14. The terminal device of claim 13, wherein the same layer comprises a transparent film between the screen cover and the display component.

* * * * *